(12) United States Patent
Koste et al.

(10) Patent No.: US 8,379,225 B2
(45) Date of Patent: Feb. 19, 2013

(54) SYSTEM FOR MONITORING A RELATIVE DISPLACEMENT OF COMPONENTS

(75) Inventors: Glen Peter Koste, Niskayuna, NY (US); Renato Guida, Wynantskill, NY (US); Charles Erklin Seeley, Niskayuna, NY (US); Hua Xia, Niskayuna, NY (US); Sachin Dekate, Niskayuna, NY (US); Daniel Fishman, Schenectady, NY (US); Kevin Sheridan, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 504 days.

(21) Appl. No.: 12/750,857

(22) Filed: Mar. 31, 2010

(65) Prior Publication Data

US 2011/0242546 A1  Oct. 6, 2011

(51) Int. Cl.
G01B 11/14 (2006.01)
G01J 1/04 (2006.01)

(52) U.S. Cl. ............... 356/614; 250/227.14; 73/660

(58) Field of Classification Search .............. None
See application file for complete search history.

(56) References Cited

U.S. PATENT DOCUMENTS

| 4,321,464 | A | * | 3/1982 | Miller | 250/237 G |
| 4,861,131 | A | | 8/1989 | Bois | |
| 5,146,776 | A | * | 9/1992 | Twerdochlib et al. | 73/660 |
| 5,469,745 | A | * | 11/1995 | Twerdochlib | 73/660 |
| 5,563,967 | A | | 10/1996 | Haake | |
| 6,046,602 | A | * | 4/2000 | Stein | 73/660 |
| 6,069,985 | A | | 5/2000 | Albin | |
| 6,276,215 | B1 | | 8/2001 | Berg | |
| 6,955,085 | B2 | * | 10/2005 | Jones et al. | 250/227.14 |
| 7,122,783 | B1 | * | 10/2006 | Pastore et al. | 250/227.14 |
| 7,323,678 | B2 | | 1/2008 | Abrate | |
| 2009/0022450 | A1 | | 1/2009 | Song | |
| 2009/0126501 | A1 | | 5/2009 | Feguson | |

FOREIGN PATENT DOCUMENTS

| EP | 1890374 A2 | 2/2008 |
| EP | 1036345 B1 | 4/2009 |
| GB | 2421075 A | 6/2006 |
| GB | 2473903 A | 3/2011 |
| WO | 2009121367 A1 | 10/2009 |
| WO | 2010030456 A2 | 3/2010 |

OTHER PUBLICATIONS

Search Report from corresponding GB Application No. GB1105352.7 mailed on Jul. 8, 2011.
G. Koste et al., "Stator End-Winding Component Monitoring System," Pending U.S. Appl. No. 12/506,287, filed Jul. 21, 2009.

* cited by examiner

Primary Examiner — Gregory J Toatley
Assistant Examiner — Juan D Valentin, II
(74) Attorney, Agent, or Firm — Ann M. Agosti (57) ABSTRACT

A system is provided for monitoring a relative displacement of a pair of end-winding components. The system includes a structure mounted to the end-winding components. The system further includes a fiber Bragg grating mounted to a non-curved surface of the structure, where the fiber Bragg grating is configured to reflect incident radiation having a peak intensity at a respective wavelength based on a strain of the fiber Bragg grating. The structure is configured so that the strain produced by the structure limits a magnitude of the strain of the fiber Bragg grating within a predetermined range over a span of the relative displacement of the pair of end-winding components.

17 Claims, 5 Drawing Sheets

SYSTEM FOR MONITORING A RELATIVE DISPLACEMENT OF COMPONENTS

BACKGROUND

The invention relates generally to a system for monitoring a relative displacement of components and more particularly, to a system for monitoring a relative displacement of end-winding components of a generator.

Rotating machines such as electric generators driven by steam turbines or gas turbines have the capacity to carry several thousand amperes of current in their stator windings. Stator windings generally comprise conductive bars secured in corresponding slots in a stator core and end windings extending beyond the stator core. End-winding components are subject to electro-dynamic and mechanical forces that induce a displacement of the end windings. Electro-dynamic forces are induced, for example, by large current passing through the end windings during starting and peak load conditions. Mechanical forces are caused by normal mechanical thermal expansion and vibrations of the rotating machine. It has been recognized that an excessive displacement of the end windings has several undesirable effects including that the winding insulation in the end windings may be destroyed leading to dielectric breakdown between end windings, and end windings may suffer from wear due to electromechanical forces that lead to premature failure of the rotating machine. There is a need in the art to monitor the end winding status, and an early and accurate detection of end winding loosening is desirable.

Conventional systems have been proposed, to detect the displacement of end winding components. However, electronic based systems have metal components that cannot be used near end winding components due to the high electromagnetic fields, and optical vibration measurement systems are too expensive for cost effective use. Thus, it would be advantageous to provide a monitoring system which addresses these shortcomings.

BRIEF DESCRIPTION

In accordance with an example embodiment, a system is provided for monitoring a relative displacement of a pair of end-winding components. The system includes a structure mounted to the end-winding components. The system further includes a fiber Bragg grating mounted to a non-curved surface of the structure, where the fiber Bragg grating is configured to reflect incident radiation having a peak intensity at a respective wavelength based on a strain of the fiber Bragg grating. The structure is configured so that the strain produced by the structure limits a magnitude of the strain of the fiber Bragg grating within a predetermined range over a span of the relative displacement of the pair of end-winding components.

In accordance with another example embodiment disclosed herein, a power generation device is provided. The power generation device includes a pair of end-winding components configured to undergo a relative displacement during an operation of the power generation device. The power generation device further includes a structure mounted to the end-winding components, and a fiber Bragg grating mounted to a non-curved surface of the structure. The fiber Bragg grating is configured to reflect incident radiation having a peak intensity at a respective wavelength, based on a strain of the fiber Bragg grating. The strain of the fiber Bragg grating results from a strain of the structure due to the relative displacement of the pair of end-winding components. The structure is configured so that the strain produced by the structure limits a magnitude of the strain of the fiber Bragg grating within a predetermined range over a span of the relative displacement of the pair of end-winding components.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Example embodiments of the invention are described in the context of stator end winding monitoring systems using fiber optic sensing cables for measuring relative displacement of end-winding components, including but not limited to supporting or connecting components directly or indirectly supporting or connecting with stator end windings including but not limited to connection rings and stator bars. Relative displacement between end-winding components is an indication of stator end winding status. "Relative displacement" herein after refers to a shift of a distance between two end-winding components. The two end-winding components may be directly adjacent to each other, or may be separated by one or more end-winding components there between. As used herein the terms "a," "an," and "the" do not denote a limitation of quantity, but rather denote the presence of at least one of the referenced items. Similarly, as used herein "two end-winding components" means at least two end-winding components.

Figure 1:
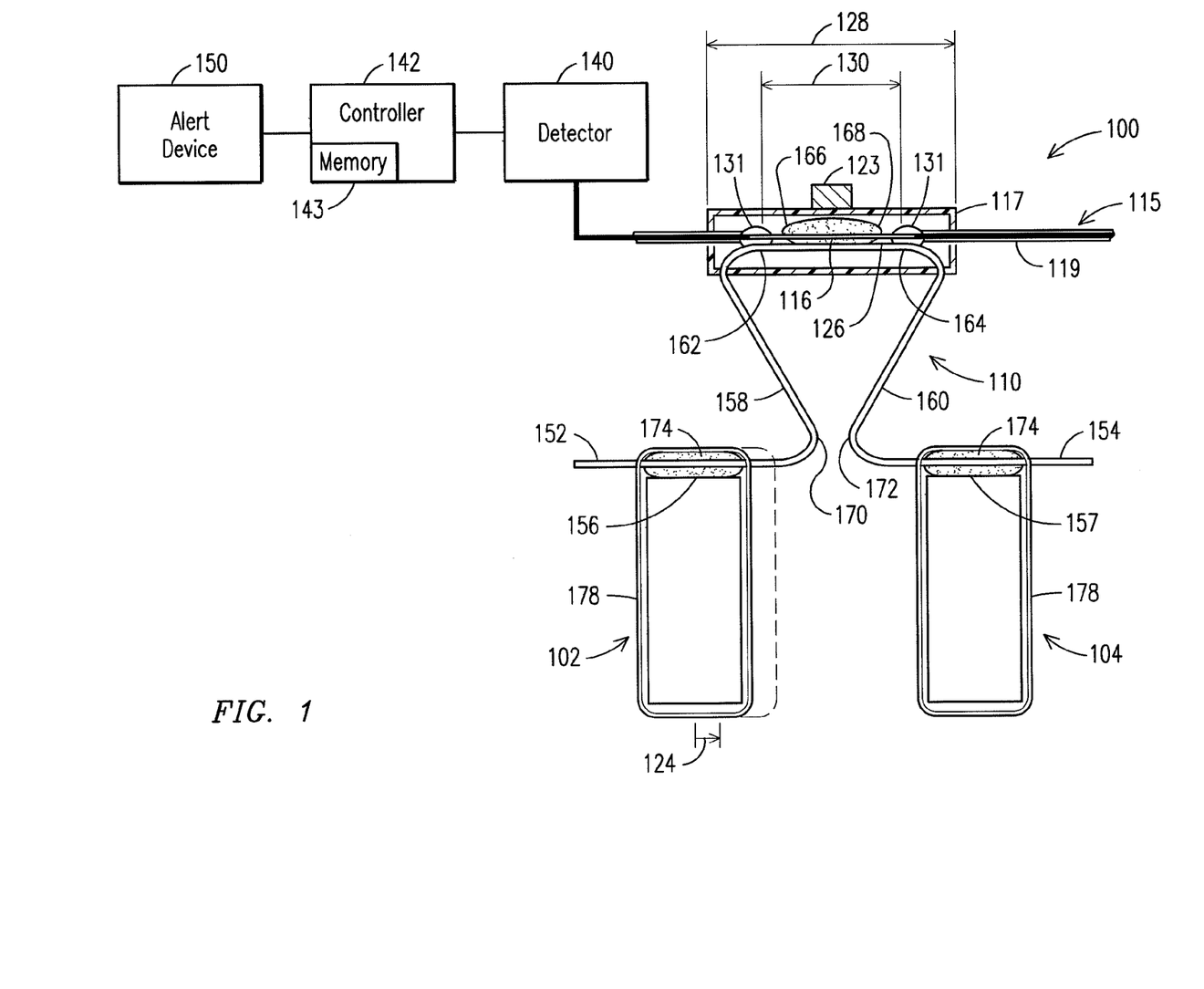
FIG. 1 is a partial side cross-sectional view of a structure and a fiber Bragg grating mounted on a pair of end-winding components according to an example embodiment of the invention.

FIG. 1 illustrates an example embodiment of a system 100 for monitoring a relative displacement 124 of a pair of end-winding components 102,104. In an example application, the system 100 may be used in a power generating device, such as an electrical generator, and the components 102,104 may be end-winding components of an electrical generator, for example. In another example application, the components 102,104 may be positioned in a high voltage and/or high magnetic field region, such as within a pressure vessel, which may not be easily accessible, for example. The components 102,104 are subject to relative displacement 124, during the operation of the generator. In one example embodiment of the present invention, the system 100 is configured to ensure that the relative displacement 124 of the components 102,104 does not to exceed a threshold or maximum relative displacement, and to configure a sensor which is capable of detecting the relative displacement 124 of the components 102,104 over a span of the relative displacement. For example, a maximum relative displacement of the components 102,104 may be 1.27 mm. However, the embodiments of the present invention are not limited to any particular numerical maximum relative displacement. The relative displacement of 1.27 mm of the components 102,104 may result from one component remaining stationary and another component shifting by 1.27 mm, or each component simultaneously displacing toward or away from one another by 0.635 mm, for example.

As illustrated in FIG. 1, a fiber Bragg grating 116 is generated within an optical fiber 115. The fiber Bragg grating 116 portion of the optical fiber 115 is securely affixed to a non-curved surface 126. That is, a flat surface but for standard manufacturing tolerances and/or nominal deviations, as will be appreciated by one of skill in the art. For protection, a jacket 119 may surround the optical fiber 115. The jacket 119 may be externally mounted to the non-curved surface 126 with a strain relief component 131 at each end 166,168 of the fiber Bragg grating 116, to provide additional mechanical link strength and prevent the fiber Bragg grating 116 from snapping away from the optical fiber 115.

It will be appreciated that the ability to externally mount fiber Bragg grating 116 onto surface 126 allows to accurately establish in a design stage of the structure a ratio of the amount of strain to the amount of relative motion. This ratio may be advantageously established in the design stage through appropriate selection of parameters of the structure, such as height and thickness. Furthermore, this ratio may be selected to be substantially constant for each structure manufactured, since the structure's dimensions can be controlled within standard manufacturing tolerances and/or nominal deviations, as will be appreciated by one of skill in the art.

It will be further appreciated that by designing the structure with a non-curved surface for mounting the fiber Bragg grating, the strain at all portions of the fiber Bragg grating will be substantially the same. This is advantageous since the respective wavelength of the reflected radiation having the peak intensity is unambiguous. If different portions of the fiber Bragg grating, which is typically about 1 centimeter long, experienced different strain, then the reflected radiation may have several peak wavelengths or a spectrally widened reflected spectrum. Under these conditions the peak may be difficult to discern, causing ambiguity in the estimated strain. A substantially flat surface with a length equal to or greater than the fiber Bragg grating length insures a uniform strain on the grating and an unambiguous peak wavelength.

As further illustrated in FIG. 1, a cover 117 is positioned around the fiber Bragg grating 116 and the strain relief component 131, for additional protection. The cover 117 is made from a non-conductive, polymer material, for example. Although FIG. 1 illustrates a fiber Bragg grating within an optical fiber, any fiber optic sensing cable may be used for measuring relative displacement of the end-winding components.

As illustrated in FIG. 1, the structure 110 includes a non-curved surface 126 onto which the jacket 119 (and fiber Bragg grating 116) may be externally mounted. Additionally, as illustrated in FIG. 1, the non-curved surface 126 has a length which may be a minimum length 128 based on a length 130 of the fiber Bragg grating 116. In an exemplary embodiment, the minimum length 128 is greater than the length 130 of the fiber Bragg grating 116, and may be greater than the combined length of the fiber Bragg grating 116 and the strain relief component 131 at each end 166,168, for example. In an exemplary embodiment, the fiber Bragg grating 116 is externally mounted to the non-curved surface 126 of the structure 110 with a suitable bonding material, such as a thermoset polymer, or any other material that is capable of holding items affixed to one another by surface attachment. In an exemplary embodiment, the length 128 of the non-curved surface 126 may be two centimeters, for example.

Figure 2:
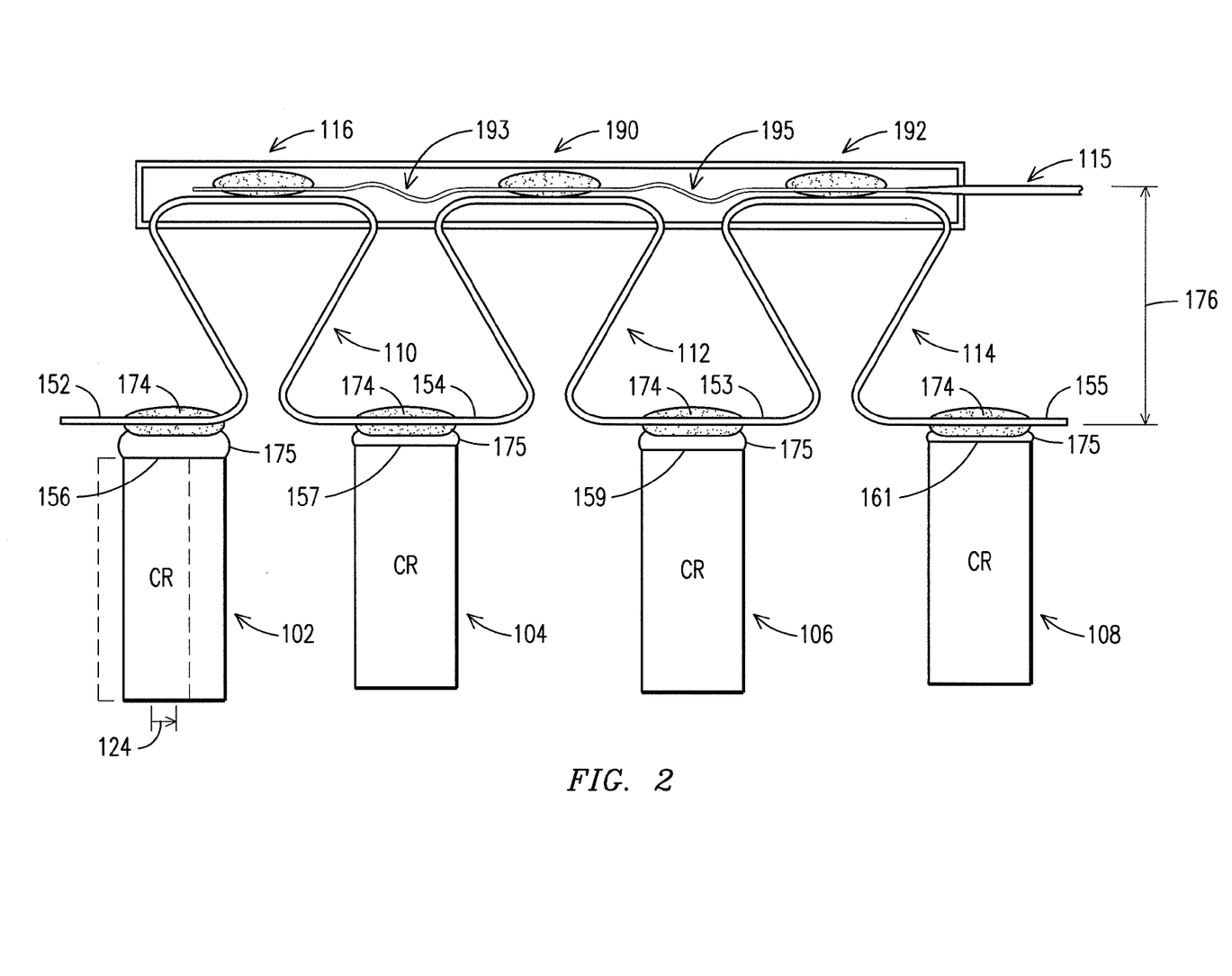
FIG. 2 is a partial side cross-sectional view of a plurality of structures and fiber Bragg gratings mounted on the end-winding components according to another example embodiment of the invention.

The structure 110 further includes a pair of additional surfaces 152,154, where the respective additional surface 152,154 is mounted to a respective first surface, or respective top surface 156,157 of the components 102,104. As illustrated in FIG. 1, the structure 110 also includes a pair of intermediate portions 158,160 which link a respective additional surface 152,154 to a respective outer end 162,164 of the non-curved surface 126. In an exemplary embodiment, the respective outer end 162,164 is longitudinally aligned with the respective outer end 166,168 of the fiber Bragg grating 116. The intermediate portions 158,160 are aligned with the additional surfaces 152,154 and the non-curved surface 126 at any one of a number of angles from 10 to 170 degrees. In an exemplary embodiment, the angle formed between the intermediate portions 158,160 and the additional surfaces 152,154 and/or non-curved surface 126 may be 60 degrees, for example. As illustrated in FIG. 1, the structure 110 takes a reverse-triangular shape, in which the intermediate portions 158,160 extend from the respective outer end 162,164 of the non-curved surface 126, in an inward direction relative to the fiber Bragg grating 116, to an end 170,172 of the respective additional surface 152,154. The respective ends 170,172 of the additional surfaces 152,154 are separated by less than the length 128 of the non-curved surface 126. The respective additional surface 152,154 is mounted to the top surface 156,157 of the respective component 102,104 with an adhesive 174, such as two-part epoxy, for example. As illustrated in FIG. 2, the additional surfaces 152,154 are mounted to the top surfaces 156,157 of the components 102,104 with a respective amount of leveling material 175, to equalize a height 176 at which the additional surfaces 152,154 are respectively mounted to the top surfaces 156,157 of the components 102,104.

As further illustrated in FIG. 1, a tie 178 is wrapped around an exterior surface of the respective component 102,104, including the top surface 156,157 of the respective component 102,104 and around the respective additional surface 152,154 of the structure 110, to enhance the mounting of the respective additional surface 152,154 of the structure 110 to the top surface 156,157 of the component 102,104.

As appreciated by one of skill in the art, the fiber Bragg grating 116 is configured to reflect incident radiation through the optical fiber 115 at a respective wavelength having a peak intensity, based on a strain 122 (see FIGS. 4-5) of the fiber Bragg grating 116. As previously discussed, strain is based on a ratio of a variation in length of the fiber Bragg grating 116 (as a result of the relative displacement 124 of the components 102,104) to the initial length of the fiber Bragg grating 116 (and similarly defined for other strain parameters discussed in this invention). The fiber Bragg grating 116 has a threshold strain range or maximum strain range, which may be provided by the manufacturer, for example, beyond which the fiber Bragg grating 116 will mechanically break down and/or fail to generate wavelength data which accurately reflects the strain forces to which it is being subjected. Thus, the embodiments of the present invention attenuate a range of the strain 122 experienced by the fiber Bragg grating 116 (as a result of relative displacement 124 of the components 102, 104) to be within the maximum strain range of the fiber Bragg grating 116. In an exemplary embodiment, a Micron Optics os3200 fiber Bragg grating strain sensor is utilized in the embodiments of the present invention, which has a maximum strain range of +/−5000 microns/m. However, the embodiments of the present invention may be utilized with any fiber Bragg grating which is utilized to monitor a relative displacement of a component, such as a connection ring of an electrical generator, for example.

As the components 102,104 are subject to the relative displacement 124, during the typical operation of the components, the non-curved surface 126 of the structure 110 is subject to strain, and thus the fiber Bragg grating 116 is subject to strain 122, as a result of the relative displacement 124 of the components 102,104. The structure 110 is designed to attenuate a range of the strain 122 of the fiber Bragg grating 116 over a range of the relative displacement 124 of the components 102,104, to within a maximum range of the strain of the fiber Bragg grating 116. The fiber Bragg grating 116 is externally mounted to the non-curved surface 126 of the structure 110, such that the range of the strain 122 of the fiber Bragg grating 116 over the span of the relative displacement 124 of the components 102,104 is within a range of the strain of the non-curved surface 126 of the structure 110 over the span of the relative displacement 124 of the components 102,104. The fiber Bragg grating 116 is externally mounted to the non-curved surface 126, and the non-curved surface 126 is non-curved and/or flat, as discussed above, such that the strain of the non-curved surface 126 over the span of the relative displacement of the components 102,104 is substantially uniform over the minimum length 128 of the non-curved surface 126, to ensure that the fiber Bragg grating 116 experiences a substantially uniform strain 122 over the minimum length 128 along which it is mounted to the non-curved surface 126.

Figure 3:
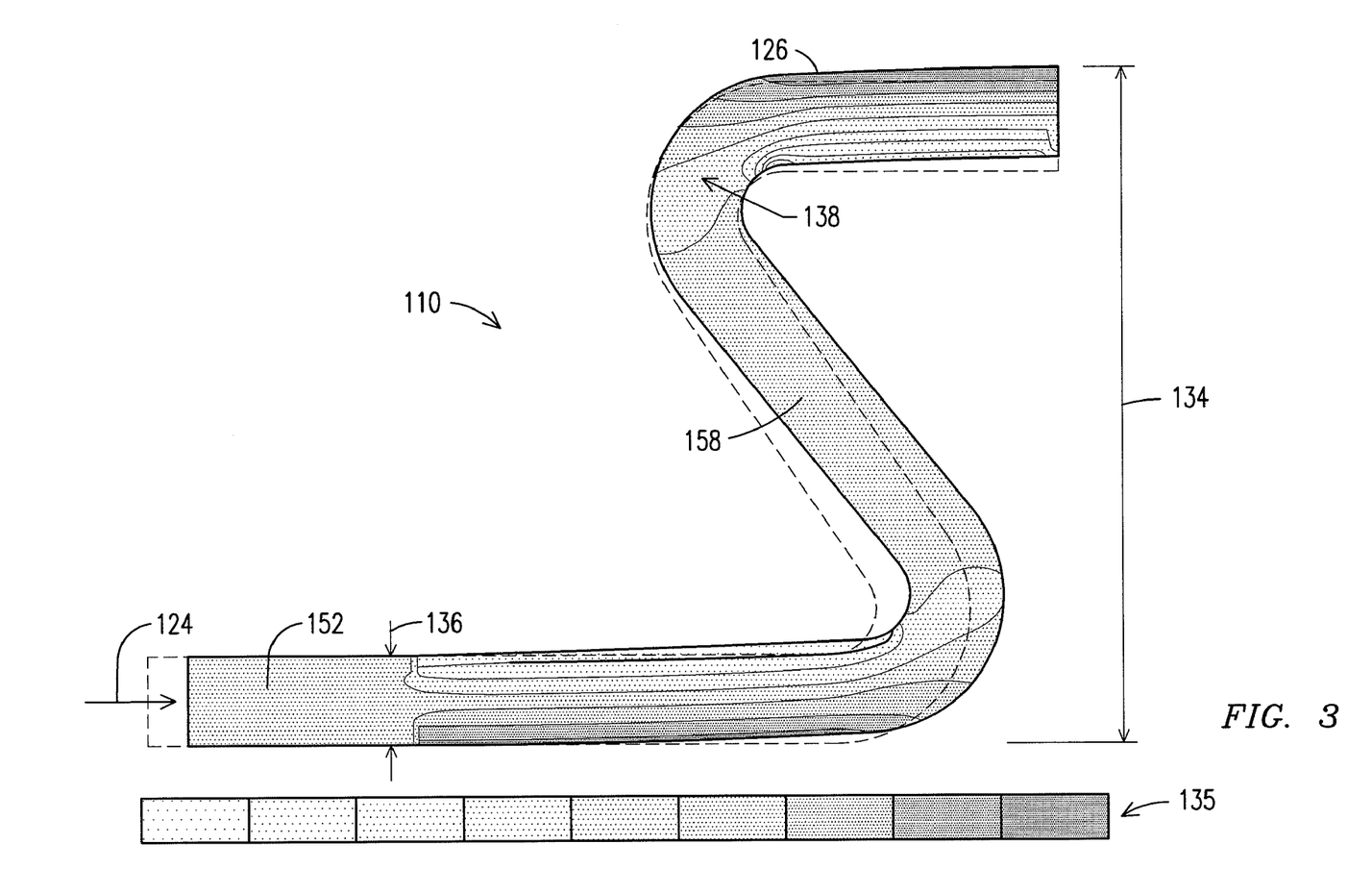
FIG. 3 is a partial cross-sectional side view of the structure in FIG. 1 during a design phase.
Figure 4:
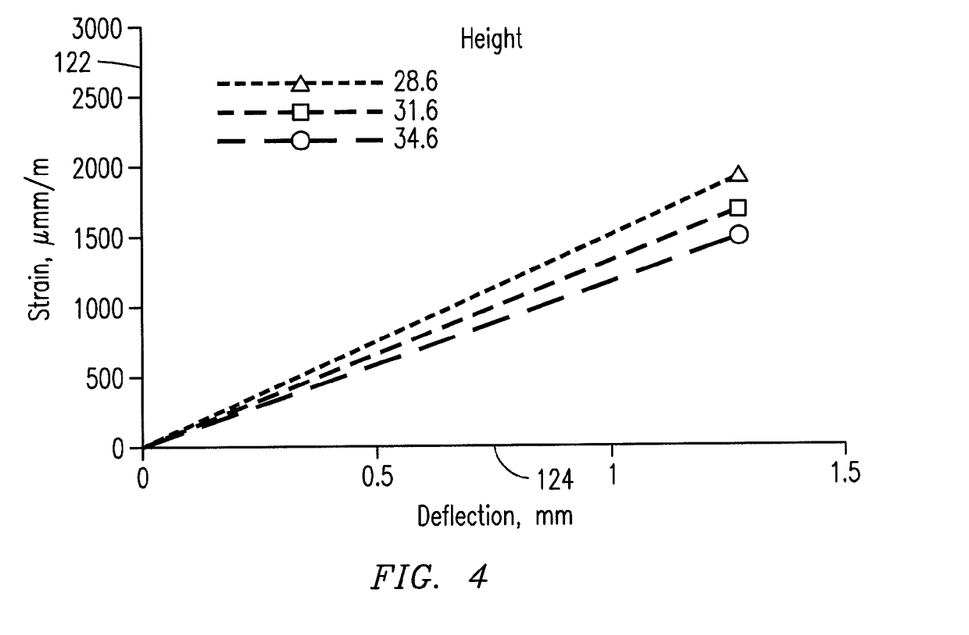
FIG. 4 is a plot of a strain of the fiber Bragg grating versus a deflection of the end-winding components for respective heights and a fixed thickness of the structure illustrated in FIG. 3 during the design phase.
Figure 5:
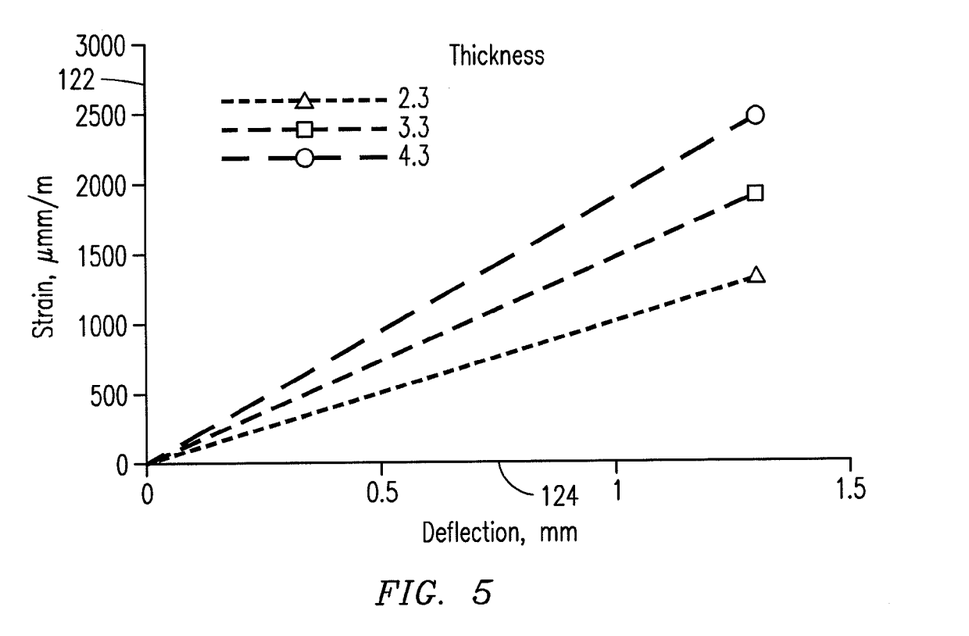
FIG. 5 is a plot of a strain of the fiber Bragg grating versus a deflection of the end-winding components for respective thicknesses and a fixed height of the structure illustrated in FIG. 3 during the design phase.

As illustrated in FIGS. 3-5, during a design mode of the structure 110, a parameter of the structure 110 is adjustably selected, such that the range of the strain of the non-curved surface 126 of the structure 110 over span of relative displacement 124 of the components 102,104 is within the maximum range of the strain 122 of the fiber Bragg grating 116. As previously discussed, the span of relative displacement 124 of the components 102,104 may be known, such as 1.27 mm, for example. Additionally, the maximum range of the strain 122 of the fiber Bragg grating 116 may be known, such as 2500 microns/m, for example. Although the design mode of FIGS. 3-5 was performed for specific boundary conditions of the span of relative displacement 124 of the components 102,104 and the maximum range of the strain 122 of the fiber Bragg grating 116, the design mode may be performed for any specific boundary conditions, based on the methods discussed herein. As illustrated in FIG. 3, the parameter of the structure 110 which is adjusted during the design mode of the structure 110 is the height 134 of the structure, the thickness 136 of the structure 110 and/or a radius of curvature 138 of a turn of the structure 110 which joins the non-curved surface 126 to an intermediate portion 158 (and a similar turn which joins the intermediate portion 158 to the additional surface 152). Note that the embodiment of FIG. 3 illustrates a half-symmetrical view of the structure 110, as the other half of the structure 110 is similarly designed, in a symmetrical manner, as appreciated by one of skill in the art.

The design mode of the structure 110 illustrated in FIGS. 3-5 utilizes a CAD (Computer Aided Design) model, which is utilized to provide a geometrical representation of the structure 110, with a particular height, thickness and radius of curvature at each turn, as appreciated by one of skill in the art. The CAD model is utilized to provide a geometric model of the structure 110, but the CAD model alone does not provide model strain or force data within the structure 110 or along the non-curved surface 126, for example, in response to relative displacement of the additional surface 152, based on relative displacement 124 of the components. As previously discussed, the embodiments of the invention are directed to configuring a structure 110 with a range of strain along the non-curved surface 126 to be within a maximum range of strain 122 of a fiber Bragg grating 116, across a span of relative displacement 124 of the components 102,104. In the exemplary embodiment, the design mode is directed to configuring a structure 110 with a non-curved surface 126 having a range of strain to be within 2500 microns/m, across a span of relative displacement of 1.27 mm. In order to consider the strain or force data on the geometric CAD model of the structure 110, the design mode of the structure 110 utilizes a FEA (finite element analysis) model, in which the CAD model of the structure 110 is separated into a plurality of individual elements which are subject to respective force equations, as appreciated by one of skill in the art. FIG. 3 illustratively depicts the strain along the non-curved surface 126 of the structure 110, across the span of relative displacement 124, using a Von Mises strain scale 135. As illustrated in FIG. 4, using the FEA model of the structure 110, the strain along the non-curved surface 126 is computed across a span of deflection of 1.27 mm, for a number of structures having various heights 134, including 28.6 mm, 31.6 mm, and 34.6 mm, while keeping the thickness 136 fixed at 3.3 mm. Similarly, as illustrated in FIG. 5, using the FEA model of the structure 110, the strain along the non-curved surface 126 is computed across a span of deflection of 1.27 mm, for a number of structures having various thicknesses 136, including 2.3 mm, 3.3 mm, and 4.3 mm, while keeping the height 134 fixed at 28.6 mm. As illustrated in FIG. 3, the design mode results in configuring the structure 110 to have a height 134 of 24 mm, a thickness 136 of 4 mm and a radius of curvature 138 at the turns of 4 mm, in order to have a range of strain along the non-curved surface 126 of 2453 microns/m, and thus to be within the maximum range of strain 122 of the fiber Bragg grating, 2500 microns/m. As previously discussed, these particular strain ranges and dimensions of the structure 110 designed from the design mode are merely exemplary, and the embodiments of the invention may be utilized to design any structure to attenuate the strain of a fiber Bragg grating over a span of relative displacement of the components, to be within the maximum range of the strain of the fiber Bragg grating, by following the same steps discussed herein. Although the FEA model of the structure 110 resulted in a height 134 of 24 mm, a thickness 136 of 4 mm and a radius of curvature of 4 mm, the structure 110 parameters are not limited to these numeric values, and include a range of height 134 of 10-40 mm, a range of thickness 136 of 1-5 mm and a range of the radius of curvature of 1-5 mm. More specifically, the embodiments of the present invention include a range of height 134 of 22-26 mm, a thickness 136 of 3.5-4.5 mm, and a radius of curvature 138 of 3.5-4.5 mm, for example. As appreciated by one of skill in the art, the parameters of the structure will vary, based on the initial boundary conditions used in the FEA model, including but not limited to, the maximum relative displacement of the components, as well as the maximum range of the strain of the fiber Bragg grating, for example.

Based on the design mode discussed above, the fiber Bragg grating 116 is configured to have the parameters, including the height 134, thickness 136 and radius of curvature 138 of the turns, as discussed above. As illustrated in FIG. 1, a multi-wavelength optical source (not shown) is connected to the optical fiber 115 and transmits multiple wavelengths of light to the fiber Bragg grating 116. Light reflected from the fiber Bragg grating 116 passes to a detector 140 that measures a shift in the respective wavelength of the reflected radiation having the peak intensity, at respective incremental displacements across the span of the relative displacement 124 of the components 102,104. As appreciated by one of skill in the art, the detector 140 is initialized to measure a shift in the wavelength of the reflected radiation from a central wavelength corresponding to a beginning strain 122 of the fiber Bragg grating 116. The central wavelength may be customized for each fiber Bragg grating, and may be provided by the manufacturer. A controller 142 is coupled to the detector 140, receives the reflected wavelength data, and converts the shift in the respective wavelength of the reflected radiation having the peak intensity into the strain 122 of the fiber Bragg grating 116 over the respective incremental displacement across the span of the relative displacement 124 of the components 102,104. In an exemplary embodiment, the controller 142 may utilize an equation to convert the wavelength shift of the reflected radiation to the strain 122 of the fiber Bragg grating 116, such as:

$$\in = \Delta\lambda / |\lambda| / G * 10^6 \quad \text{Equation 1}$$

Where $\in$ is the strain 122 of the fiber Bragg grating 116, $\Delta\lambda$ is the measured shift in the wavelength from the central wavelength, $|\lambda|$ is the absolute value of the measured wavelength and G is the gauge factor for the fiber Bragg grating 116. In an exemplary embodiment, the gauge factor is 0.81, for example. The gauge factor may vary with each fiber Bragg grating, and may be provided by the manufacturer, for example.

Figure 6:
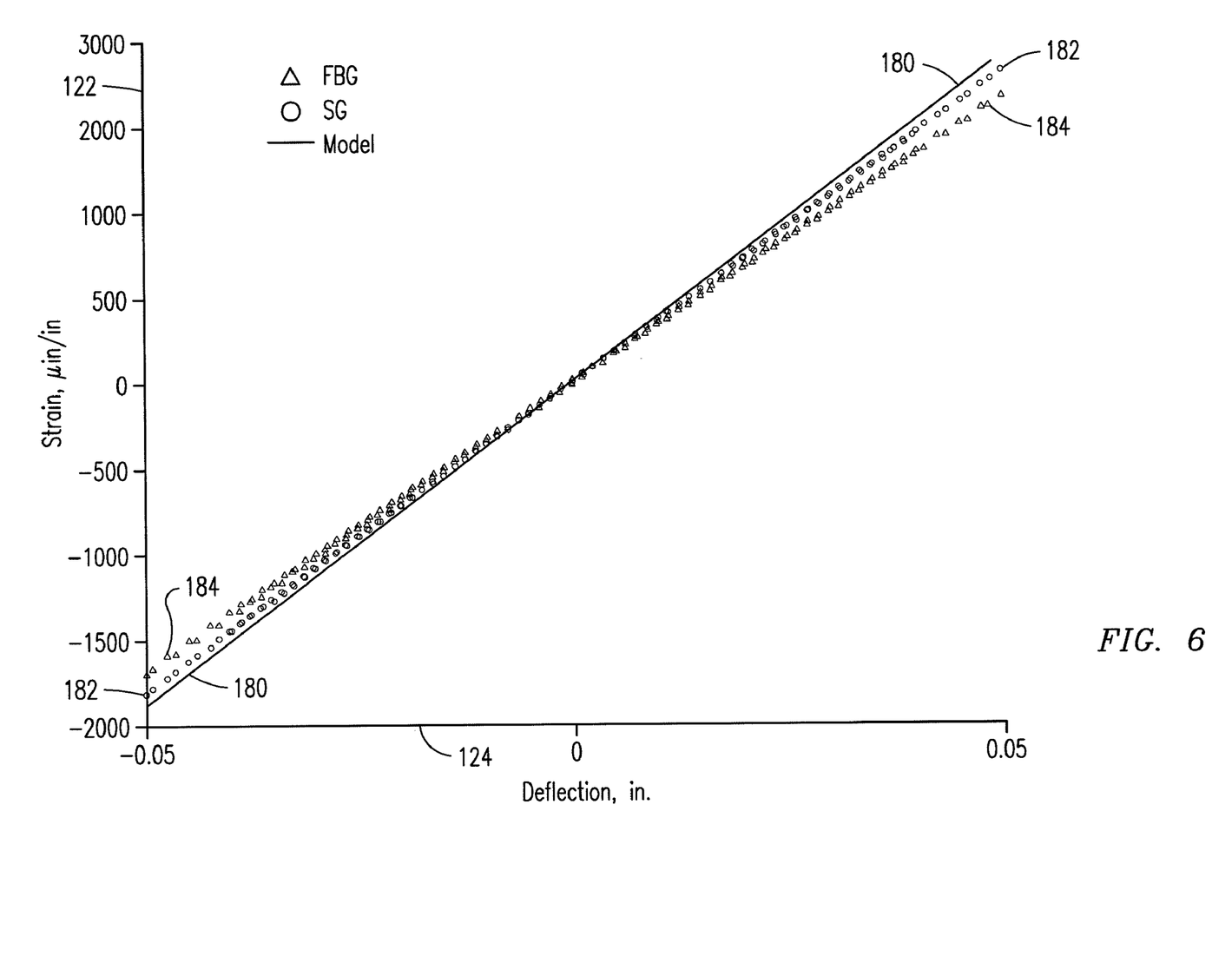
FIG. 6 is a plot of a strain of the fiber Bragg grating over a span of displacement of the end-winding components illustrated in FIG. 1.

During a calibration mode of the system 100, the respective wavelength shift of the reflected radiation having the peak intensity is converted into an estimated strain data 184 (equation 1) over the respective incremental displacements 124. Additionally, as illustrated in FIG. 6, the estimated strain data 184 including the respective strain 122 of the fiber Bragg grating 116 is plotted, versus the incremental displacement 124 of the components 102,104. As illustrated in FIG. 6, the estimated strain data 184 is closely matched to the FEA model data 180, based on the strain data acquired during the design mode of the FEA structure. Additionally, strain gauge data 182 is illustrated in FIG. 6, which represents the measured strain of a strain gauge 123 (FIG. 1) of the non-curved surface 126, over the span of the relative displacement 124. As appreciated by one of skill in the art, the strain gauge 123 is a gauge made from a foil metal material, whose electrical properties vary with strain (i.e., variation in length), and thus the strain gauge 123 provides an independent measurement of the strain of the non-curved surface 126, across the span of the relative displacement 124 of the components 102,104. As illustrated in FIG. 6, the FEA model data 180, from which the selection of the height 134, thickness 136 and radius of curvature 138 parameters of the structure 110 were selected, closely approximates the two independent sets of the estimated strain data 184 and the strain gauge data 182 acquired over the span of the relative displacement 124. Thus, the selected parameters of the structure 110 during the design mode were effective to attenuate the range of strain 122 of the fiber Bragg grating 116 to within the maximum range of strain of the fiber Bragg grating 116 across the span of relative displacement 124 of the components 102,104, and thus the fiber Bragg grating 116 is operable to monitor the relative displacement of the components 102,104 across their relative displacement 124 span.

During a monitoring mode, the system 100 may be used to ensure that the relative displacement 124 of the components 102,104 does not exceed a maximum threshold relative displacement 124. As with the calibration mode above, the detector 140 measures the shift in the respective wavelength with the peak intensity from the reflected radiation. The controller 142 receives the wavelength shift data, and retrieves the stored relative displacement 124 data of the components 102,104 from the memory 143 corresponding to the measured shift in the respective wavelength with the peak intensity. The controller 142 compares the stored relative displacement 124 with a maximum relative displacement of the components 102,104, to determine whether the components 102,104 have displaced beyond the maximum threshold and/or a safety threshold. The controller 142 outputs a signal to an alert device 150, if the stored relative displacement exceeds the maximum relative displacement of the components 102,104. For example, the alert device 150 may be an audible device, to alert workers in the facility housing the components 102,104, that the components 102,104 may have displaced by an unsafe amount, and recommended subsequent action, such as further investigation of the relative displacement.

As illustrated in FIG. 2, the system 100 may be used with more than one pair of components (102,104)(104,106)(106, 108), to monitor a relative displacement of the components 102,104,106. The system 100 includes a respective structure 110,112,114 externally mounted to each respective pair of components (102,104)(104,106)(106,108), which effectively form a triangular serpentine network. The system 100 further includes a respective fiber Bragg grating 116, 190, 192 externally mounted to each structure 110,112,114, where the respective fiber Bragg grating 116,190,192 reflects radiation with a peak intensity at a respective wavelength based on a strain of the respective fiber Bragg grating 116,190,192. Although the fiber Bragg gratings 116,190,192 are optically coupled to the same optical fiber 115, they have a unique center-wavelength corresponding to a beginning strain, and thus the reflected wavelength at a peak intensity of the first fiber Bragg grating 116 will not affect the operation of the second fiber Bragg grating 190. The respective structure 110, 112,114 attenuates a range of the strain of the respective fiber Bragg gratings 116,190,192 over a span of the relative displacement of the respective pair of components (102,104) (104,106)(106,108) to within a maximum range of the strain of the respective fiber Bragg grating 116,190,192. The respective structures 110,112,114 may be designed, having individual parameters which may be determined using the model mode discussed above, along with the specific boundary conditions, such as the maximum strain of the fiber Bragg grating, an amount of slack 193,195 in the fibers between the fiber Bragg gratings 116, 190 and 192), and the relative span of each component pair. In addition, reducing the amount of strain and wavelength change of the fiber Bragg gratings 116,190,192 allows one to place more transducers on the same fiber with wavelength division multiplexing since each fiber Bragg grating 116,190,192 requires a smaller portion of the wavelength spectrum available. As discussed above with regard to the structure 110 in FIG. 1, the respective additional surfaces 152,154,153,155 are respectively mounted to the top surfaces 156,157,159,161 of the respective component 102, 104,106,108 with an adhesive 174, such as two-part epoxy, for example. As illustrated in FIG. 2, the respective additional surfaces 152,154,153,155 are respectively mounted to the top surfaces 156,157,159,161 of the respective component 102, 104,106,108 with a respective amount of leveling material 175, such as putty, for example, to equalize a height 176 at which the additional surfaces 152,154,153,155 are mounted to the top surfaces 156,157,159,161 of the components 102, 104,106,108, relative to the fiber 115. For example, a greater amount of leveling material 175 may be positioned on the top surface 156 than the top surface 157, to equalize the height of the top surfaces 156,157.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

The invention claimed is:

1. A system for monitoring a relative displacement of a pair of end-winding components, said system comprising:
a structure mounted to the pair of end-winding components;
a fiber Bragg grating mounted in between the pair of end-winding components to a non-curved surface of the structure, said fiber Bragg grating configured to reflect incident radiation, said reflected radiation having a peak intensity at a respective wavelength based on a strain of the fiber Bragg grating, said strain of the fiber Bragg grating resulting from a strain of the structure due to the relative displacement of the pair of end-winding components;
wherein the structure is configured so that the strain produced by the structure limits a magnitude of the strain of the fiber Bragg grating within a predetermined range over a span of the relative displacement of the pair of end-winding components.

2. The system of claim 1, wherein the pair of end-winding components is a pair of adjacent connection rings in a power generator.

3. The system of claim 1, wherein the range of the strain of the fiber Bragg grating over the span of the relative displacement of the end-winding components is the range of a strain of the non-curved surface of the structure over the span of the relative displacement of the end-winding components.

4. The system of claim 3, wherein said non-curved surface has a length based on a length of the fiber Bragg grating, and wherein said strain of the non-curved surface over the span of the relative displacement of the end-winding components is uniform over the length of the non-curved surface.

5. The system of claim 3, wherein said fiber Bragg grating is mounted to the non-curved surface of the structure with a bonding material.

6. The system of claim 3, wherein said structure further comprises a pair of additional surfaces, wherein a respective additional surface is mounted to a first surface of a respective end-winding component; said structure further comprising a pair of intermediate portions each configured to link a respective additional surface to a respective outer end of the non-curved surface, said respective outer end being aligned with a respective outer end of the fiber Bragg grating; said intermediate portions being aligned with the additional surfaces and non-curved surface at a non-orthogonal angle.

7. The system of claim 6, wherein said structure consists of a reverse-triangular shape, in which said intermediate portions extend from the respective outer end of the non-curved surface, in an inward direction relative to the fiber Bragg grating, to an end of the respective additional surface; wherein said respective end of the additional surfaces being separated by less than the length of the non-curved surface.

8. The system of claim 6, wherein said respective additional surface is mounted to the first surface of the respective end-winding component with a respective amount of leveling material, to equalize a height at which said pair of additional surfaces are mounted to the pair of first surfaces of the end-winding components.

9. The system of claim 6, wherein at least one parameter of the structure is selected, such that the range of the strain of the non-curved surface of the structure over the relative displacement of the components is within the predetermined range of the strain of the fiber Bragg grating.

10. The system of claim 9, wherein the parameter is at least one of a height between the non-curved surface and the additional surfaces and a thickness of at least one of the non-curved surface, the additional surfaces and the intermediate portions.

11. The system of claim 8, wherein a tie is wrapped around an exterior surface of the respective end-winding component including the first surface of the respective component and around the respective additional surface of the structure, to enhance the mounting of the respective additional surface of the structure to the first surface of the component.

12. The system of claim 1, further comprising:
a detector configured to measure a shift in the respective wavelength of the reflected radiation having the peak intensity at respective incremental displacements across the span of the relative displacement of the end-winding components;
a controller coupled to the detector, said controller configured to convert the shift in the respective wavelength of the reflected radiation having the peak intensity into the strain of the fiber Bragg grating over the respective incremental displacement across the span of the relative displacement of the end-winding components;
wherein during a calibration mode, the respective wavelength shift of the reflected radiation having the peak intensity and the respective strain of the fiber Bragg grating over the respective incremental displacements are stored in a memory of the controller.

13. The system of claim 12, wherein during a monitoring mode:
said detector is configured to measure the shift in the respective wavelength having the peak intensity from the reflected radiation;
said controller is configured to retrieve the stored relative displacement of the end-winding components from the memory corresponding to the measured shift in the respective wavelength having the peak intensity;
said controller is configured to compare the stored relative displacement with a predetermined relative displacement of the end-winding components, to determine whether the components have displaced beyond a safety threshold; and said controller is configured to output a signal to an alert device, based on the stored relative displacement having exceeded the predetermined relative displacement of the end-winding components.

14. The system of claim 1, wherein the system is for monitoring a relative displacement of a plurality of pairs of end-winding components, comprising:

a respective structure mounted to each pair of end-winding components;

a respective fiber Bragg grating mounted to each structure, said respective fiber Bragg grating configured to reflect radiation having a peak intensity at a respective wavelength based on a strain of the respective fiber Bragg grating, said strain of the respective fiber Bragg grating resulting from a strain of the respective structure due to the relative displacement of the respective pair of end-winding components;

wherein said respective structure is configured so that the strain produced by the respective structure limits a magnitude of the strain of the respective fiber Bragg grating within a respective predetermined range over a respective span of the relative displacement of the respective pair of end-winding components.

15. The system of claim 1, wherein the fiber Bragg grating is externally mounted onto the non-curved surface of the structure.

16. A power generation device, comprising:

a pair of end-winding components configured to undergo a relative displacement during an operation of the power generation device;

a structure mounted to the pair of end-winding components; and a fiber Bragg grating mounted in between the pair of end winding components to a non-curved surface of the structure, said fiber Bragg grating configured to reflect incident radiation, said reflected radiation having a peak intensity at a respective wavelength based on a strain of the fiber Bragg grating, said strain of the fiber Bragg grating resulting from a strain of the structure due to the relative displacement of the pair of end-winding components;

wherein the structure is configured so that the strain produced by the structure limits a magnitude of the strain of the fiber Bragg grating within a predetermined range over a span of the relative displacement of the pair of end-winding components.

17. The power generation device of claim 16, wherein the fiber Bragg grating is externally mounted onto the non-curved surface of the structure.

\* \* \* \* \*